United States Patent [19]

Yosizato et al.

[11] 4,365,032
[45] Dec. 21, 1982

[54] MONOESTER COMPOUND OF 2,2-ALKYLIDENE BIS(4,6-DI-SUBSTITUTED PHENOL)

[75] Inventors: Akihiko Yosizato; Yoshinori Morifuji; Kunio Kondo, all of Moriyama; Masatsugu Yoshino, Numazu, all of Japan

[73] Assignee: Asahi Kasei Kogyo Kabushiki Kaisha, Osaka, Japan

[21] Appl. No.: 318,018

[22] Filed: Nov. 4, 1981

Related U.S. Application Data

[63] Continuation of Ser. No. 100,457, Dec. 5, 1979, abandoned.

[30] Foreign Application Priority Data

Dec. 6, 1978 [JP] Japan .................. 53-150063
Oct. 25, 1979 [JP] Japan .................. 54-137051
Nov. 28, 1979 [JP] Japan .................. 54-152872

[51] Int. Cl.³ .................. C08K 5/34; C07D 5/13; C07C 67/14; C07C 67/08; C07C 69/92; C07C 69/88; C07C 69/78; C07C 69/74; C07C 69/28
[52] U.S. Cl. .................. 524/99; 524/291; 560/61; 560/104; 560/105; 560/121; 560/123; 560/124; 560/140; 560/221; 546/322
[58] Field of Search .................. 524/99, 291; 560/61, 560/105, 121, 140; 546/322

[56] References Cited

U.S. PATENT DOCUMENTS

| | | | |
|---|---|---|---|
| 3,265,661 | 8/1966 | Rocklin | 560/140 |
| 3,428,711 | 2/1969 | Hunt | 260/859 |
| 3,579,561 | 5/1971 | Meltsner | 560/108 |
| 3,642,669 | 2/1972 | Nast | 260/2.5 BB |
| 3,795,700 | 3/1974 | Song et al. | 546/318 |
| 4,107,137 | 8/1978 | Proux et al. | 560/140 |
| 4,168,387 | 9/1979 | Cottman | 560/104 |

FOREIGN PATENT DOCUMENTS

| | | | |
|---|---|---|---|
| 43-18453 | 8/1968 | Japan | 524/291 |
| 52-29850 | 3/1977 | Japan | . |
| 53-29352 | 8/1978 | Japan | . |

OTHER PUBLICATIONS

Die Angewandte Makromolekulare Chemie, 28, pp. 13-19, (1973).

Primary Examiner—V. P. Hoke
Attorney, Agent, or Firm—Finnegan, Henderson, Farabow, Garrett & Dunner

[57] ABSTRACT

A monoester compound of a 2,2'-alkylidene bis(4,6-di-substituted phenol) useful as an antioxidant in synthetic polymers having good resistant to oxides of nitrogen fumes, represented by the formula (I),

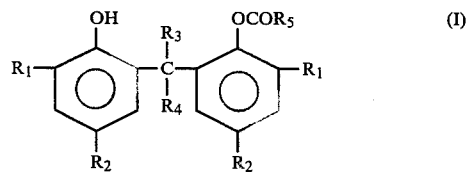

wherein $R_1$ and $R_2$, which may be the same or different, each represents a $C_{1-4}$ alkyl group, a $C_{5-6}$ cycloalkyl group or a methyl-substituted $C_{5-6}$ cycloalkyl group; and one of $R_3$ and $R_4$ represents a hydrogen atom and the other represents a hydrogen atom or a $C_{1-10}$ alkyl group or both of them represent a methyl group; $R_5$ represents a $C_{4-9}$ alkyl group, a $C_{3-7}$ cycloalkyl group, a $C_{2-4}$ alkenyl group, a phenyl group, a $C_{1-4}$ alkyl-substituted phenyl group, a $C_{1-4}$ alkoxy-substituted phenyl group, a mono- or di- $C_{1-4}$ alkyl-substituted hydroxyphenyl group, a styryl group, a benzyl group or a pyridyl group, and a method of preparing such a monoester compound.

42 Claims, No Drawings

MONOESTER COMPOUND OF 2,2-ALKYLIDENE BIS(4,6-DI-SUBSTITUTED PHENOL)

This is a continuation of application Ser. No. 100,457, filed Dec. 5, 1979, now abandoned.

BACKGROUND OF THE INVENTION

1. Field of the Invention

This invention relates to a monoester compound of a 2,2'-alkylidene bis(4,6-di-substituted phenol and to a method of preparing such a monoester compound.

2. Description of the Prior Art

In order to prevent articles of synthetic resins from reducing their commercial value due to deterioration and discoloration by heat and light or oxides of nitrogen fumes, various stabilizers for synthetic resins including antioxidants and their improvements have been proposed. For this purpose, light stabilizers, sulfur type antioxidants, phosphites and phenol type antioxidants have been used either alone or in combination. Many of these stabilizers, however, are still not sufficient in their stabilizing effect over a long period of time since they are unstable as such to heat or air oxidation and further, some of them discolor synthetic resins by the action of atmospheric oxides of nitrogen. In general, antioxidants against deterioration by the action of light having a much improved stabilizing effect tend to discolor synthetic resins by the action of heat and light or oxides of nitrogen fumes. On the other hand, antioxidants having a high resistance to oxides of nitrogen fumes are inferior in their stability against deterioration by the action of light. Thus, these stabilizers do not have the antideterioration effect and anit-discoloration effect simultaneously at a satisfactory level. For example, U.S. Pat. No. 3,642,669 describes alkoxy substituted, sterically hindered phenols having a 2-(2'-hydroxy-3'-tertiary alkyl benzyl)-anisole unit as the stabilizer for polyurethanes against light and hot air. Their anti-discoloration effect against atmospheric oxides of nitrogen fumes and anti-deterioration against light are still not sufficiently satisfactory. U.S. Pat. No. 3,428,711 describes the use of a copolymer of diisopropylaminoethyl methacrylate and decyl methacrylate as an anti-discoloring agent against atmospheric oxides of nitrogen and 4,4'-butylidene bis(6-tert-butyl-m-cresol) as an anti-oxidant in combination for the stabilization of polyurethanes against ultraviolet radiation and fume. Further, Japanese patent application (OPI) 29352/1978 describes the use of a hydrazinotriazine derivative and a sulfur-containing acid ester compound in combination for the stabilization of polyurethanes against discoloration. Such a combination, however, has not a sufficient effect on anti-discoloration and retention of the desirable properties of the original polyurethane such as strength. Japanese patent application (OPI) 29850/1977 describes a polyester including, as it representative, [2-(2''-hydroxy-3'-tert-butyl-5'-methylbenzyl)-4-methyl-6-tert-butylphenyl]terephthalate as the stabilizer of polyurethane. This stabilizer has an anti-discoloration effect but its effect is not enough. Moreover, the stabilizer disadvantageously bleeds from the surface of polyurethane articles. As widely employed antioxidants, there can be mentioned 2,2'-isobutylidene bis(4,6-dimethyl-phenol), 2,2'-methylene bis(4-methyl-6-tert-butylphenol), 2,2'-(3,5,5-trimethylhexylidene)-bis(4,6-dimethylphenol) and 2,2'-methylene bis(4,6-dimethylphenol) but they are disadvantageously discolored as such. Yet stabilizers which have better anti-deterioration effect and anti-discoloration effect on synthetic resins at the same time have been sought.

SUMMARY OF THE INVENTION

According to the present invention there is provided a monoester compound of a 2,2'-alkylidene bis(4,6-disubstituted phenol) represented by the formula (I),

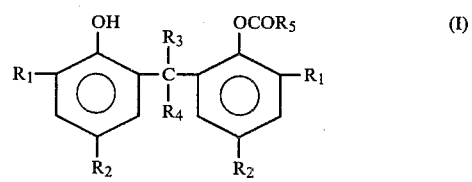

wherein $R_1$ and $R_2$, which may be the same or different, each represents a $C_{1-4}$ alkyl group, a $C_{5-6}$ cycloalkyl group or a methyl-substituted $C_{5-6}$ cycloalkyl group; and one of $R_3$ and $R_4$ represents a hydrogen atom and the other represents a hydrogen atom or a $C_{1-10}$ alkyl group or both of them represent a methyl group; $R_5$ represents a $C_{4-9}$ alkyl group, a $C_{3-7}$ cycloalkyl group, a $C_{2-4}$ alkenyl group, a phenyl group, a $C_{1-4}$ alkyl-substituted phenyl group, a $C_{1-4}$ alkoxy-substituted phenyl group, a mono- or di- $C_{1-4}$ alkyl-substituted hydroxyphenyl group, a styryl group, a benzyl group or a pyridyl group.

Also, according to this invention, there is provided a method of preparing the same monoester compound as described above.

The monoester compounds of 2,2'-alkylidene bis(4,6-di-substituted phenols) of this invention are very desirable as antioxidants for synthetic resins which inhibit discoloration by the action of oxides of nitrogen fumes as well as heat and light and which, at the same time, substantially retain the desirable properties of the original synthetic resin when physically mixed with a synthetic resin to obtain a stabilized product.

DETAILED DESCRIPTION OF THE INVENTION

Preferred groups represented by $R_1$ and $R_2$ in the formula (I) are methyl, ethyl, propyl, tert-butyl, cyclohexyl and 1-methylcyclohexyl groups. Preferred groups represented by $R_3$ and $R_4$ are hydrogen atoms, methyl, ethyl, heptyl and nonyl groups and branched $C_{3-8}$ alkyl groups such as isopropyl and 2,4,4-trimethylpentyl groups. Preferred groups represented by $R_5$ are comparatively bulky groups such tert-butyl, n-octyl, cyclohexyl, vinyl, 1-propenyl, isopropenyl, 2,2-dimethylvinyl, phenyl, methylphenyl, especially 4-methylphenyl, 4-tert-butylphenyl, 4-methoxyphenyl, 4-butoxyphenyl, 3,5-di-tert-butyl-4-hydroxyphenyl, benzyl, styryl, pyridyl, especially 2-, 3- and 4-phridyl groups.

Exemplary monoester compounds of this invention include the monoester compounds as set forth in Table 1 below.

TABLE 1
| Number | Monoester Compound |
|---|---|
| 1 | 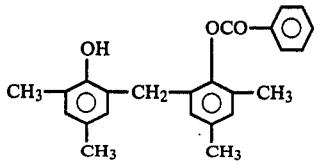 |
| 2 | 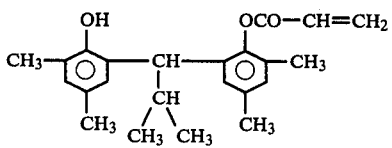 |
| 3 | 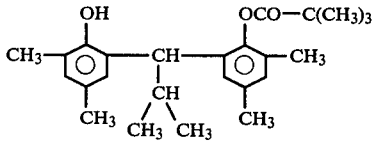 |
| 4 | 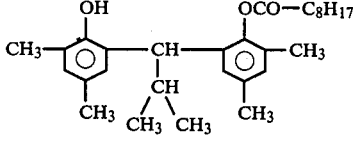 |
| 5 | 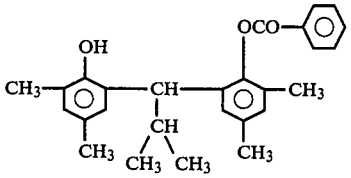 |
| 6 | 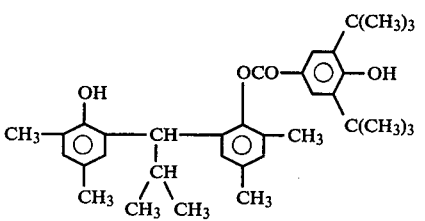 |
| 7 | 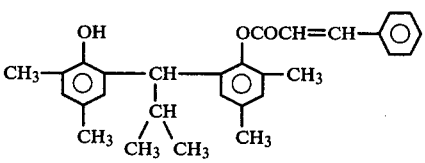 |
| 8 | 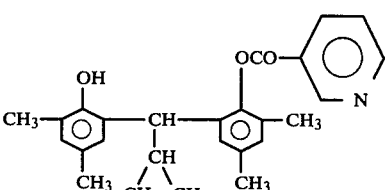 |
TABLE 1-continued
| Number | Monoester Compound |
|---|---|
| 9 | 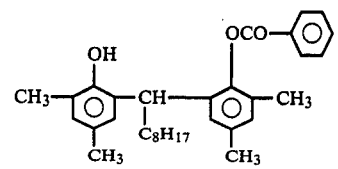 |
| 10 | 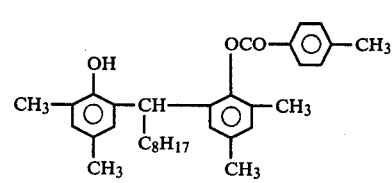 |
| 11 | 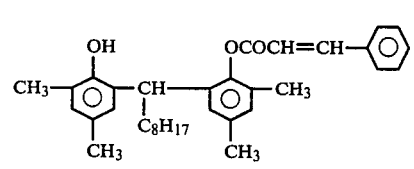 |
| 12 | 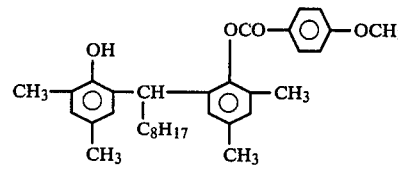 |
| 13 | 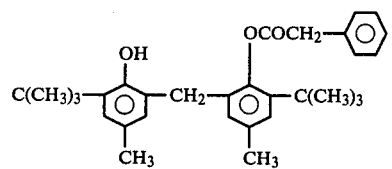 |
| 14 | 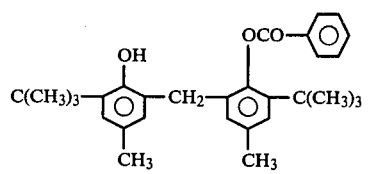 |
| 15 | 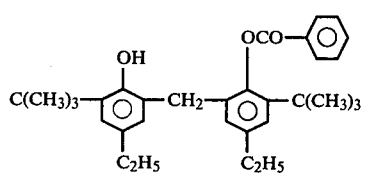 |
| 16 | 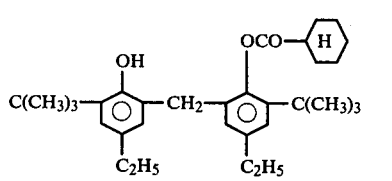 |

TABLE 1-continued

| Number | Monoester Compound |
|---|---|
| 17 | 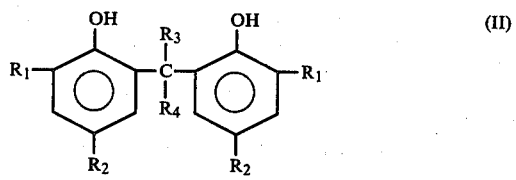 (structure) |
| 18 | (structure with OC4H9) |
| 19 | (structure with OCOCH=CH—CH3) |
| 20 | (structure) |
| 21 | (structure with OCOC(CH3)=CH2) |

Note:
In Numbers 9, 10, 11 and 12, the C8H17 group is a 2,4,4-trimethylpentyl group.
In Number 4, the C8H17 group is a n-octyl group.

The monoester compound of a 2,2'-alkylidene bis(4,6-di-substituted phenol) of this invention can be prepared by reacting a 2,2'-alkylidene bis(4,6-di-substituted phenol) of the formula (II), (II)

wherein
$R_1$, $R_2$, $R_3$ and $R_4$ are the same as defined in the formula (I), with an esterifying agent selected from the group consisting of the compounds of the formulas (III) and (IV),
$R_5COCl$ (III) and $(R_5CO)_2O$ (IV)
wherein $R_5$ is the same as defined in the formula (I).

In this reaction a large amount of the diester compound of the 2,2'-alkylidene bis(4,6-di-substituted phenol) of the formula (V),

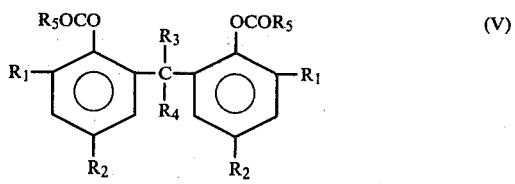

(V)

wherein $R_1$, $R_2$, $R_3$, $R_4$ and $R_5$ are the same as defined in the formula (I), in addition to the monoester compound can easily be produced at the same time due to the presence of two phenolic hydroxyl groups of an equivalent value in the structural formula of the 2,2'-alkylidene bis(4,6-di-substituted phenol). This diester compound does not have any antioxidation effect for a synthetic resin. Furthermore, the diester compound bleeds from the synthetic resin when blended with the synthetic resin. Especially when the diester compound is employed for making fibers, the diester compound bleeds as white powder onto the surface of the fibers and causes breaking of fibers in knitting, resulting in a harmful influence upon the process efficiency. For this reason, by-production of the diester compound should be suppressed as much as possible. On the other hand, when by-production of the diester compound is suppressed, the amount of unreacted 2,2'-alkylidene bis(4,6-di-substituted phenol) remaining in the reaction product is increased. The monoester compound of a low purity which contains this unreacted 2,2'-alkylidene bis(4,6-di-substituted phenol) therein loses the resistance to discoloration by the action of light and oxides of nitrogen fumes which is very advantageous as an antioxidant for the synthetic resin, and remarkably discolors the synthetic resin. A permissible amount of unreacted 2,2'-alkylidene bis(4,6-di-substituted phenol) which may be incorporated into the synthetic resin is at most about 5 percent by weight based on the total amount of unreacted 2,2'-alkylidene bis(4,6-di-substituted phenol), the monoester compound and the diester compound. Amounts of unreacted 2,2'-alkylidene bis(4,6-di-substituted phenol) of more than 5 percent by weight remarkably discolor the synthetic resin upon exposure to light and oxides of nitrogen fumes.

In preparing the monoester compound of this invention having a high purity, the diester compound and unreacted 2,2'-alkylidene bis(4,6-di-substituted phenol) may be removed from the reaction mixture by recrystallization using a suitable solvent.

According to this invention, the monoester compound of this invention having a high purity at high yields can be prepared by conducting the reaction between a 2,2'-alkylidene bis(4,6-di-substituted phenol) and an esterifying agent under specific reaction conditions.

Examples of suitable 2,2'-alkylidene bis(4,6-di-substituted phenols) which can be used in this invention include 2,2'-methylene bis(4,6-dimethylphenol), 2,2'-methylene bis(4-ethyl-6-tert-butylphenol), 2,2'-methylene bis[4-methyl-6-(1-methylcyclohexyl)phenol], 2,2'-methylene bis(4-methyl-6-cyclohexylphenol), 2,2'-methylene bis(4-methyl-6-tert-butylphenol), 2,2'-ethylidene bis(4,6-dimethylphenol), 2,2'-ethylidene bis(4-methyl-6-tert-butylphenol), 2,2'-isopropylidene bis(4,6-dimethylphenol), 2,2'-isopropylidene bis(4-methyl-6-tert-butylphenol), 2,2'-propylidene bis(4,6-dimethylphenol), 2,2'-propylidene bis(4-methyl-6-tert-butylphenol), 2,2'-isobutylidene bis(4,6-dimethylphenol), 2,2′-isobutylidene bis(4-methyl-6-tert-butylphenol), 2,2′-isobutylidene bis(4-ethyl-6-tert-butylphenol), 2,2′-isobutylidene bis(4-methyl-6-cyclohexylphenol), 2,2′-octylidene bis(4,6-dimethylphenol), 2,2′-(3,5,5-trimethylhexylidene)-bis (4,6-dimethylphenol), 2,2′-(3,5,5-trimethylhexylidene)-bis(4-methyl-6-tert-butylphenol) and 2,2′-decylidene bis(4,6-dipropylphenol).

Example of suitable esterifying agents which can be employed in this invention $C_{4-9}$ alkanecarboxylic acid chlorides, cyclopropanecarboxylic acid chloride, cyclobutanecarboxylic acid chloride, cyclopentanecarboxylic acid chloride, cyclohexanecarboxylic acid chloride, cycloheptanecarboxylic acid chloride, acryloyl chloride, methacryloyl chloride, 3,3-dimethylacryoyl chloride, benzoyl chloride, toluoyl chloride, p-tert-butylbenzoyl chloride, p-methoxybenzoyl chloride, 4-hydroxy-3,5-di-tert-butylbenzoyl chloride, p-butoxybenzoyl chloride, crotonoyl chloride, cinnamoyl chloride, phenylacetyl chloride, nicotinoyl chloride, isonicotinoyl chloride, picolinoyl chloride, $C_{4-9}$ alkanecarboxylic anhydrides, cyclohexanecarboxylic anhydride, benzoic anhydride, cinnamic anhydride, toluic anhydrides and phenylacetyl anhydride.

The mole ratio of the esterifying agent to the 2,2′-alkylidene bis(4,6-di-substituted phenol) is substantially 1.0. A preferred mole ratio ranges from about 1.0 to about 1.3 and a more preferred mole ratio ranges from 1.00 to 1.10. A most preferred mole ratio is 1.02.

The reaction of this invention is carried out in the presence of a reaction medium primarily in order to form a liquid phase where the 2,2′-alkylidene bis(4,6-di-substituted phenol) can be uniformly contacted with the esterifying agent.

Exemplary reaction media which can be used in this invention include dioxane, benzene, chlorobenzene, nitrobenzene, xylene, toluene, pyridine, N,N-dimethylformamide and N,N-dimethylacetamide.

The amount of the reaction medium which can be used in this invention is at least about 3 times, preferably from about 4 to about 10 times the total weight of the 2,2′-alkylidene bis(4,6-di-substituted phenol) and the esterifying agent.

In order to accelerate the reaction, it is preferred that the reaction of this invention is carried out in the presence of a basic catalyst. Such basic catalysts include, for example, heterocyclic amines such as pyridine; nitrogen-containing compounds whose nitrogen atom is not linked with a hydrogen atom such as triethylamine, triallylamine, tetramethylurea, N,N-dimethylformamide, dimethylacetamide, and basic ion exchange resins.

The amount of the basic catalyst which can be employed in this invention is typically from about 1 to about 2 moles per mole of the esterifying agent.

The reaction temperature is typically in the range of about 0° C. to about 100° C. Further, in order to prepare the monoester compound of the formula (I) at high yields, it is preferred that the reaction temperature is maintained at a temperature of from about 0° C. to about 30° C., more preferably at about 20° C. until about 50% of the 2,2′-alkylidene bis(4,6-di-substituted phenol) employed is converted to the monoester compound of the formula (I). When the reaction temperature is higher than about 30° C. before about 50% of the compound of the formula (II) are converted to the monoester compound of the formula (I), formation of the diester compound of the 2,2′-alkylidene bis(4,6-substituted phenol) of the formula (V) is disadvantageously increased. After about 50% of the 2,2′-alkylidene bis(4,6-di-substituted phenol) is converted to the monoester compound of the formula (I), it is preferred to raise the reaction temperature to a temperature of from about 50° C. to about 100° C., more preferably to about 80° C. in order to shorten the completion of the reaction time.

It is preferred that the reaction of this invention is conducted in a dry inert atmosphere such as dry nitrogen gas.

Further, in order to suppress by-production of the diester compound, it is preferred that the 2,2′-alkylidene bis(4,6-di-substituted phenol) is firstly added to and completely dissolved in the reaction medium containing the basic catalyst and secondly the esterifying agent is added thereto to react with the 2,2′-alkylidene bis(4,6-di-substituted phenol).

The monoester compound of this invention may suitably be added to any compatible synthetic resin in amounts sufficient to give the desired degree of antioxidation. The amount of the monoester compound which can be employed in this invention widely varies depending upon the synthetic resin employed, the shape of the synthetic resin in the final form and the degree of antioxidation desired. Typically about 0.001 part to about 10 parts by weight of the monoester compound of this invention are incorporated into 100 parts by weight of the synthetic resin.

Exemplary synthetic resins which can be stabilized with the monoester compounds of this invention against degradation or discoloration by the action of heat and light or fume include α-olefin polymers such as polyethylene, polypropylene, polybutenes; polyolefin copolymers such as ethylene-propylene copolymer, ethylene-vinyl acetate copolymer; halogen-containing synthetic resins such as polyvinyl chloride, polyvinyl bromide, polyvinyl fluoride, polyvinylidene chloride, chlorinated polyethylene, chlorinated polypropylene, polyvinylidene fluoride, brominated polyethylene, chlorinated rubber, vinyl chloride-vinyl acetate copolymer, vinyl chloride-propylene copolymer, vinyl chloride-styrene copolymer, vinyl chloride-isobutylene copolymer, vinyl chloride-vinylidene chloride copolymer, vinyl chloride-styrene-maleic anhydride terpolymer, vinyl chloride-styrene-acrylonitrile terpolymer, vinyl chloride-butadiene copolymer, vinyl chloride-isoprene copolymer, vinyl chloride-chlorinated propylene copolymer, vinyl chloride-vinylidenechloride-vinyl acetate terpolymer, vinyl chloride-acrylate copolymer, vinyl chloride-maleate copolymer, vinyl chloride-methacrylate copolymer, vinyl chloride-acrylonitrile copolymer; acrylonitrile-butadiene-styrene copolymer, acrylate-butadiene-styrene copolymer, methacrylate-butadiene-styrene copolymer, polystyrene, acrylic resins, polyvinyl acetate, methacrylate resins, polyvinyl alcohol, polyvinyl formal, polyvinyl butyral, polyester, polyamide, polycarbonate, polyacetal, polyurethane, phenolic resin, polyacetate, urea resin, melamine resin, unsaturated polyester, silicone resin, cross-linked synthetic resin such as cross-linked polyethylene in which cross-linking is conducted with a peroxide or by ionizing radiation; foamed synthetic resins such as foamed polystyrene foamed with a blowing agent; and rubbers such as isoprene rubber, butadiene rubber, acrylonitrile-butadiene copolymer; and any blends thereof. Of these synthetic resins, the monoester compounds of this invention are especially effective as antioxidants having good resistance to fume fading for polyurethanes.

Although the monoester compounds of this invention are effective antioxidants when used alone, other known stabilizers such as light stabilizers, phosphite type compounds and sulfur type antioxidants may be used in addition to or in partial substitution for these monoester compounds.

Exemplary light stabilizers include hydroxybenzophenones such as 2-hydroxy-4-methoxybenzophenone; benzotriazoles such as 2-(2'-hydroxy-3',5'-di-tert-butylphenyl)-5-chlorobenzotriazole; benzoates such as phenyl salicylate; substituted acrylonitriles; and piperidines such as bis(2,2,6,6-tetramethyl-4-piperidine)sebacate and tris(2,2,6,6-tetramethyl-4-piperidine)trimellitate. Exemplary phosphite type compounds include trioctyl phosphite, tricresyl phosphite, tris(nonylphenyl) phosphite, tris(octylphenyl) phosphite, diisodecylphenol phosphite, tris(2-tert-butylphenyl) phosphite, distearyl pentaerythritol diphosphite and tetra(tridecyl)-4,4'-butylidene bis(3-methyl-6-tert-butyl phenol) diphosphite. Exemplary sulfur type antioxidants include distearylthio dipropionate and dilaurylthio propionate.

The following Examples are given to illustrate the present invention more specifically. However, it should be understood that the invention is in no way limited by these Examples. All parts and percentages in these Examples are by weight unless otherwise indicated.

EXAMPLE 1

Preparation of 1-(2-hydroxy-3,5-dimethylphenyl)-1-(2-benzoyloxy-3,5-dimethylphenyl)-2-methylpropane (Compound No. 5 in Table 1)

In a 500 ml three-necked flask equipped with a stirrer, a thermometer and a dropping funnel, 2,2'-isobutylidene bis(4,6-dimethylphenol) in an amount as set forth in Table 2 was completely dissolved in a mixed liquid of 10 g (126.6 mmoles) of pyridine and 200 g of toluene. While keeping the contents at 20° C. in a dry nitrogen atmosphere, benzoyl chloride in an amount as set forth in Table 2 was added thereto dropwise from a dropping funnel with vigorous stirring over about 30 minutes and the mixture was stirred for another 30 minutes. As the result of analysis of the reaction mixture solution by gas chromatography, the monoesterification was 74%, 55.2% and 45% in Run Nos. 1, 2 and 3, respectively.

Further, the reaction mixture solution was heated to 80° C. and kept at 80° C. for two hours. The monoesterification of the reaction mixture solution thus obtained was 97%, 74% and 59% in Run Nos. 1, 2 and 3, respectively.

After completion of the reaction, the pyridine salt precipitated was separated by filtration from the reaction mixture solution and toluene layer was washed with a large a quantity of water to thoroughly remove by-products and toluene was distilled off, resulting in a solid product. As the result of analysis by gas chromatography, the solid product contained 1-(2-hydroxy-3,5-dimethylphenyl)-1-(2-benzoyloxy-3,5-dimethylphenyl)-2-methylpropane as the monoester compound, 2,2'-isobutylidene bis(4,6-dimethylphenol) as the starting material and 1-bis(2-benzoyloxy-3,5-dimethylphenyl)-2-methylpropane as the diester compound in amounts as set forth in Table 2.

The melting point of the product was 129° C.–130° C. and the infrared absorption spectrum showed absorptions at 3530 cm$^{-1}$ for $\nu_{OH}$, 1735 cm$^{-1}$ for $\nu_{C=O}$ and 1250 cm$^{-1}$ and 1140 cm$^{-1}$ for $\nu_{C-O}$.

TABLE 2

| Run No. | 2,2'-Isobutylidene bis(4,6-dimethylphenol) [g(mmole)] | Benzoyl chloride [g(mmole)] | Mole ratio* | Purity of Product (weight percent) | | |
|---|---|---|---|---|---|---|
| | | | | Monoester Compound | 2,2'-Isobutylidene bis(4,6-dimethylphenol) | Diester Compound |
| 1 | 20 (67.1) | 9.6 (68.3) | 1.02 | 97.2 | 0.1 | 2.7 |
| 2 | 20 (67.1) | 9.2 (65.8) | 0.98 | 72.3 | 11.2 | 16.5 |
| 3 | 20 (67.1) | 12.7 (90.6) | 1.35 | 58.6 | 0.4 | 41.0 |

Note:
*: Mole ratio of benzoyl chloride to 2,2'-Isobutylidene bis(4,6-dimethylphenol)

EXAMPLE 2

The same procedures as in Example 1, Run No. 1 were repeated except that the temperature and the time required for achieving the monoesterification of 50% and the temperature and the time after having achieved the monoesterification of 50% as set forth in Table 2 were employed. The purity of the product by gas chromatographic analysis is shown in Table 3.

TABLE 3

| Run No. | Temperature & Time Required for Achieving Monoesterification of 50% | | Temperature & Time after Achieving Monoesterification of 50% | | Purity of Product (weight percent) | | |
|---|---|---|---|---|---|---|---|
| | (°C.) | (hour) | (°C.) | (hour) | Monoester Compound | 2,2'-Isobutylidene bis(4,6-dimethylphenol) | Diester Compound |
| 1 | 110 | ≦0.5 | 110 | 0.1 | 40.3 | 21.2 | 38.5 |
| 2 | 80 | ≦0.5 | 80 | 2 | 69.4 | 10.4 | 20.2 |
| Example 1 Run No. 1 | 20 | ≦1 | 80 | 2 | 97.2 | 0.1 | 2.7 |
| Comparative Run No. 1* | | | | | 10.5 | 89.5 | 0 |

Note:
*: The reaction was continued at −5° C. for 30 hours, and only in this Run unreacted benzoyl chloride was detected by gas chromatography.

EXAMPLE 3

Preparation of 1-(2-hydroxy-3,5-dimethylphenyl)-1-(2-benzoyloxy-3,5-dimethylphenyl)-2-methylpropane (Compound No. 5 in Table 1)

In a 500 ml three-necked flask equipped with a stirrer, a thermometer and a dropping funnel, 20 g (67.1 mmoles) of 2,2'-isobutylidene bis(4,6-dimethylphenol)

were dissolved in 200 g of N,N-dimethylacetamide. While keeping the contents at 20° C. in a dry nitrogen atmosphere, 100 g of N,N-dimethylacetamide in which 15.5 g (68.6 mmoles) of benzoic anhydride had been dissolved were added dropwise thereto from the dropping funnel and the mixture was stirred for one hour at 20° C. As the result of gas chromatographic analysis of the reaction mixture solution, the monoesterification was 72%.

Further, the reaction mixture solution was heated to 80° C. and kept at 80° C. for four hours. The monoesterification of the reaction mixture solution thus obtained was 95%.

After completion of the reaction, N,N-dimethylacetamide was distilled off from the reaction mixture solution and the residue was washed firstly with a 5% aqueous sodium carbonate and secondly thoroughly with water, then added with 50 ml of hexane and left to stand to give 26.5 g of a powdery product at a yield of 98.2%. The melting point of this product was 129° C. to 130° C. and its infrared absorption spectrum was the same as that in Example 1. As the result of analysis on purity by gas chromatography, the product contained 97.0 percent by weight of 1-(2-hydroxy-3,5-dimethylphenyl)-1-(2-benzoyloxy-3,5-dimethylphenyl)-2-methylpropane as the monoester compound, 0.7 percent by weight of 2,2'-isobutylidene bis(4,6-dimethylphenol) as the starting material and 2.3 percent by weight of 1-bis(2-benzoyloxy-3,5-dimethylphenyl)-2-methylpropane as the diester compound.

Further, the N,N-dimethylacetamide reaction mixture solution as such after completion of the reaction showed a satisfactory effect as an antioxidant resistant to discoloration for polyurethane, polystyrene, polymethyl methacrylate and polyamide.

EXAMPLE 4

The monoester compounds of this invention as set forth in Table 1 were prepared by the methods similar to those according to Example 1 or Example 3 at yields of about 94% to about 99%.

The results of elemental analyses and infrared absorption spectra of the monoester compounds are shown in Table 4.

TABLE 4

| Run No. | Number of Monoester Compound in Table 1 | Melting point (°C.) | Elemental Analysis | | | | Infrared Absorption Spectrum (cm$^{-1}$) | | Process* |
|---|---|---|---|---|---|---|---|---|---|
| | | | C (%) | | H (%) | | | | |
| | | | Calculated | Found | Calculated | Found | $\nu_{OH}$ | $\nu_{C=O}$ | |
| 1 | 2 | Oil | 78.38 | 78.44 | 8.01 | 8.16 | 3520 | 1730 | A |
| 2 | 3 | Oil | 78.49 | 78.58 | 8.96 | 8.73 | 3480 | 1725 | A |
| 3 | 5 | 129–130 | 80.56 | 80.50 | 7.51 | 7.45 | 3530 | 1735 | A |
| 4 | 7 | 148–152 | 81.27 | 80.98 | 7.53 | 7.26 | 3540 | 1730 | A |
| 5 | 8 | 78–80 | 77.39 | 77.51 | 7.24 | 7.10 | 3550–3000 (broad) | 1735 | A |
| 6 | 9 | 65–69 | 81.32 | 81.02 | 8.53 | 8.70 | 3480 | 1710 | B |
| 7 | 10 | 138–140 | 81.44 | 81.57 | 8.70 | 8.90 | 3470 | 1705 | B |
| 8 | 13 | 45–48 | 81.18 | 81.37 | 8.35 | 8.62 | 3500 | 1745 | B |
| 9 | 14 | 150–151 | 81.04 | 81.12 | 8.16 | 8.33 | 3460 | 1710 | B |
| 10 | 15 | 58–60 | 81.32 | 81.29 | 8.53 | 8.47 | 3480 | 1715 | B |
| 11 | 16 | 46–49 | 80.46 | 80.15 | 9.49 | 9.22 | 3490 | 1730 | A |
| 12 | 20 | 70–72 | 82.40 | 82.36 | 8.45 | 8.51 | 3490 | 1710 | B |

Note:
*: Process A was a method according to Example 1.
Process B was a method according to Example 3.

EXAMPLE 5

By mixing rolls were mixed 100 parts of a ABS resin (tradename: "Stylac 200", product of Asahi-Dow Limited), 0.5 parts of zinc stearate, 0.2 part of bis(2,2,6,6-tetramethyl-4-piperidine)sebacate and 1.0 part of 1-(2-hydroxy-3,5-dimethylphenyl)-1-(2-benzoyloxy-3,5-dimethylphenyl)-2-methylpropane having a purity as set forth in Table 5 and the mixture was extruded at 200° C. to give pellets. Then the pellets were injection-molded at 230° C. into a film having a thickness of 0.5 mm. The film thus obtained was subjected to the following light resistance test.

Light Resistance Test

The film was exposed to light in a carbon weather-ometer for 40 hours and the degree of discoloration was judged by eye according to five classes of color change, i.e. Class 1 (extreme color change) to Class 5 (negligible or no color change). Also, the film was exposed to light in a carbon weather-ometer for 400 hours and then the tensile strength of the film was measured by an Instron type tensile testing machine and the retention of strength was calculated from the formula, $$\text{Retention of Strength (\%)} = \frac{\text{Tensile strength after light exposure}}{\text{Tensile strength before light exposure}} \times 100$$

The results are shown in Table 5.

TABLE 5

| Sample No. | Purity of Monoester Compound (weight %) | | | Light Resistance | |
|---|---|---|---|---|---|
| | Monoester Compound | 2,2'-Isobutylidene bis(4,6-dimethylphenol) | Diester Compound | Retention of Strength (%) | Degree of Color Change (Class) |
| 1 | 97.2 | 0.1 | 2.7 | 96 | 5 |
| 2 | 96.0 | 4.0 | 0 | 92 | 4 |

TABLE 5-continued

| Sample No. | Purity of Monoester Compound (weight %) | | | Light Resistance | |
|---|---|---|---|---|---|
| | Monoester Compound | 2,2'-Isobutylidene bis(4,6-dimethylphenol) | Diester Compound | Retention of Strength (%) | Degree of Color Change (Class) |
| 3 | 95.0 | 5.0 | 0 | 89 | 1 |
| 4 | 90.0 | 0 | 10.0 | 73 | 5 |
| Comparative Sample No. | | | | | |
| 1 | none | none | none | 38 | 2 |

Note:
In Sample No. 1, the solid product as obtained in Example 1 was employed as the moester compound.
In Sample Nos. 2 to 4, pure 1-(2-hydroxy-3,5-dimethylphenol)-1-(2-benzoyloxy-3,5-dimethylphenyl)-2-methylpropane, pure 1-bis(2-benzoyloxy-3,5-dimethylphenyl)-2-methylpropane and pure 2,2'-isobutylidene bis(4,6-dimethylphenyl) were employed.

EXAMPLE 6

By mixing rolls were mixed and kneaded 100 parts of the same ABS resin as in Example 5, 0.5 part of zinc stearate, 0.2 part of bis(2,2,6,6-tetramethyl-4-piperidine)sebacate, 0.2 part of tris(2-tert-butylphenyl)phosphite and 0.3 part of the monoester compound of this invention or the conventional phenol compound as set forth in Table 6 and the mixture was extruded at 200° C. to give pellets. Then the pellets were injection-molded at 230° C. into a film having a thickness of 0.5 mm. The results of the same light resistance test as in Example 5 and the following thermal resistance test on the film obtained are shown in Table 6.

Thermal Resistance Test

The film was placed in a gear oven at 100° C. for 20 hours in an air atmosphere and the degree of discoloration was judged by eye according to five classes of color change, i.e. Class 1 (extreme color change) to Class 5 (negligible or no color change).

TABLE 6

| Sample No. | Monoester Compound or Conventional Phenol Compound | Light Resistance Retention of Strength (%) | Thermal Resistance Color Change (Class) |
|---|---|---|---|
| 1 | Compound No. 1 in Table 1 | 90 | 5 |
| 2 | Compound No. 17 in Table 1 | 91 | 5 |
| 3 | Compound No. 18 in Table 1 | 83 | 5 |
| 4 | Compound No. 19 in Table 1 | 80 | 5 |
| 5 | Compound No. 20 in Table 1 | 94 | 5 |
| Comparative Sample No. | | | |
| 1 | None | 34 | 2 |
| 2 | 2,2'-Methylene bis(4,6-dimethylphenol) | 38 | 2 |
| 3 | 2,2'-Methylene bis(4-methyl-6-cyclohexylphenol) | 37 | 3 |
| 4 | 2,2'-Methylene bis[4-methyl-6-(1-methylcyclohexyl)phenol] | 41 | 3 |

EXAMPLE 7

In a nitrogen gas stream 100 parts of a polytetramethylene glycol having a number average molucular weight of 1200 were reacted with 31.2 parts of 4,4'-diphenylmethane diisocyanate at 95° C. for 90 minutes with stirring to give a prepolymer having terminal isocyanate groups. Then the prepolymer was cooled to 15° C., added with 236 parts of dry N,N-dimethylformamide and dissolved therein to give a prepolymer solution. Separately, 2.28 parts of ethylenediamine and 0.51 part of diethylamine were dissolved in 157 parts of dry N,N-dimethylformamide to prepare a solution. To this solution was added the prepolymer solution at 15° C. to give a polyurethane solution having a viscosity of 780 poises at 30° C. and then the polyurethane solution was added with the monoester compound of this invention as set forth in Table 1 in an amount as set forth in Table 7 and uniformly mixed. The solution thus obtained was spun into filaments of 40 deniers by the conventional dry spinning method.

Further, part of the filaments was washed in a bath containing 5 g/l of a synthetic detergent (tradename "New Beads", product of Kao Sekken Co., Ltd.) for 5 minutes, washed with water and dried.

Also, the same procedures as described above were repeated except that the conventional antioxidant and-/or anti-discoloring agent against oxides of nitrogen in the atmosphere in an amount as set forth in Table 8 was employed instead of the monoester compound of this invention to obtain comparative filaments.

The filaments thus obtained were subjected to the following light resistance test and fume fading resistance test and the results are shown in Tables 7 and 8.

Light Resistance Test

The filaments were exposed to ultraviolet radiation in a fadeometer for 40 hours and then their strength at break was measured by a tensile tester (tradename "Tensilon, Model UTM-III L", manufactured by Toyo Measuring Instruments Co., Ltd.) and the retention of strength was calculated from the same formula as described in Example 5.

Fume Fading Resistance Test

In accordance with the method of American Association of Textile Chemists and Colorists Test Method 23-1971, "Colorfastness to Oxides of Nitrogen in the Atmosphere", the filaments were exposed to atmospheric oxides of nitrogen and the resistance to color change was determined. The effect on the color of the filaments was expressed and defined by five classes, i.e. Class 1 (extreme color change) to Class 5 (negligible or no color change) by reference to the Gray Scale for Color Change.

As is clearly understood, the monoester compounds of this invention had both antioxidation effect and resistance to discoloration against fume for polyurethane even when they were used alone and moreover, these effects were maintained even after the washing treatment. On the other hand, when the conventional antioxidants or anti-discoloring agents against fume were used separately, only one of their effects was exhibited. Furthermore, even when they were used in combination, their effects were remarkably lost after the washing test.

TABLE 7

| Filament No. | Number of Monoester Compound in Table 1 | Amount Added (%)[*1] | Retention of Strength (%) Untreated Filament[*2] | Retention of Strength (%) Treated Filament[*3] | Color Change (Class) Untreated Filament[*2] | Color Change (Class) Treated Filament[*3] |
|---|---|---|---|---|---|---|
| 1 | 1 | 1 | 90.0 | 81.2 | 5 | 5 |
| 2 | 2 | 2 | 80.4 | 68.5 | 4 | 4 |
| 3 | 3 | 2 | 82.2 | 70.4 | 4 | 4 |
| 4 | 4 | 2 | 89.1 | 72.5 | 5 | 4 |
| 5 | 5 | 1 | 96.3 | 91.2 | 5 | 5 |
| 6 | 6 | 1 | 96.8 | 90.8 | 5 | 5 |
| 7 | 7 | 1 | 95.3 | 92.1 | 5 | 5 |
| 8 | 8 | 1 | 91.2 | 81.7 | 4 | 4 |
| 9 | 9 | 1 | 91.3 | 84.5 | 5 | 5 |
| 10 | 10 | 1 | 88.6 | 85.2 | 5 | 5 |
| 11 | 11 | 2 | 89.5 | 70.1 | 5 | 5 |
| 12 | 12 | 2 | 87.1 | 75.4 | 5 | 4 |
| 13 | 13 | 1 | 80.5 | 69.8 | 4 | 4 |
| 14 | 14 | 1 | 87.3 | 73.8 | 5 | 5 |
| 15 | 15 | 1 | 83.2 | 77.2 | 5 | 5 |
| 16 | 16 | 1 | 90.7 | 74.3 | 5 | 4 |
| 17 | 17 | 2 | 83.3 | 71.6 | 5 | 5 |
| 18 | 18 | 2 | 85.6 | 72.4 | 5 | 4 |
| 19 | 19 | 2 | 89.2 | 70.6 | 4 | 4 |
| 20 | 20 | 1 | 90.5 | 80.3 | 5 | 5 |
| 21 | 21 | 2 | 81.5 | 71.2 | 4 | 4 |

Note:
[*1]Amount added in percent by weight based on the weight of the polyurethane solution.
[*2]Filament as such after spinning.
[*3]Filament subjected to the washing treatment after spinning.

TABLE 8

| Comparative Filament No. | Conventional Antioxidant | Amount Added (%)[*1] | Anti-discoloring Agent against Fume | Amount Added (%)[*1] | Retention of Strength (%) Untreated Filament[*2] | Retention of Strength (%) Treated Filament[*3] | Color Change (Class) Untreated Filament[*2] | Color Change (Class) Treated Filament[*3] |
|---|---|---|---|---|---|---|---|---|
| 1 | None | 0 | None | 0 | 41.6 | 31.2 | 1 | 1 |
| 2 | 4-Methyl-2,6-bis(2'-hydroxy-3'-tert-butyl-5'-methylbenzyl)anisole | 2 | None | 0 | 82.5 | 63.4 | 4 | 3 |
| 3 | [2-(2'-Hydroxy-3'-tert-butyl-5'-methylbenzyl)-4-methyl-6-tert-butylphenyl]terephalate | 2 | None | 0 | 79.5 | 60.2 | 4 | 3 |
| 4 | 2,2'-Isobutylidene bis(4,6-dimethylphenol) | 2 | None | 0 | 60.8 | 54.9 | 1 | 1 |
| 5 | 2,2'-Methylene bis(4-methyl-6-tert-butylphenol) | 2 | None | 0 | 69.2 | 60.8 | 1 | 1 |
| 6 | None | | 2-Benzylamino-4,6-bis-asym-dimethylhydrazino-s-triazine Dilaurylthio dipropionate | 2<br>1 | 90.2 | 69.5 | 4 | 2 |
| 7 | 4,4'-Butylidene bis(3-methyl-6-tert-butylphenol) | 2 | None | 0 | 83.1 | 60.7 | 1 | 1 |
| 8 | 4,4'-Butylidene bis(3-methyl-6-tert-butylphenol) | 2 | Copolymer of diisopropyl-aminoethyl methacrylate and decyl methacrylate (weight ratio, 75:25) | 2 | 81.2 | 60.3 | 4 | 2 |
| 9 | Tetrakis[methyl-3-(3,5-di-tert-butyl-4-hydroxyphenyl)propionate]methane | 2 | None | 0 | 85.0 | 71.2 | 1 | 1 |
| 10 | Tetrakis[methyl-3-(3,5-di-tert-butyl-4-hydroxyphenyl)propionate]methane | 2 | 2-Benzylamino-4,6-bis-asym-dimethylhydrazino-s-triazine Dilaurylthio | 2<br>1 | 90.0 | 69.5 | 4 | 2 |

TABLE 8-continued

| Comparative Filament No. | Conventional Stabilizer | | | | Comparative Filament | | | |
|---|---|---|---|---|---|---|---|---|
| | Conventional Antioxidant | Amount Added (%)*1 | Anti-discoloring Agent against Fume | Amount Added (%)*1 | Retention of Strength (%) | | Color Change (Class) | |
| | | | | | Untreated Filament*2 | Treated Filament*3 | Untreated Filament*2 | Treated Filament*3 |
| | | | dipropionate | | | | | |

Note:
*1 Amount added in percent by weight based on the weight of the polyurethane solution.
*2 Filament as such after spinning.
*3 Filament subjected to the washing treatment after spinning.

EXAMPLE 8

By mixing rolls were mixed and kneaded 100 parts of a low density polyethylene having a specific gravity of 0.922 and a melt index of 2.0, 0.3 part of dilaurylthiodipropionate, 0.3 part of tris(2,2,6,6-tetramethyl-4-piperidine)trimellitate, 0.2 part of zinc stearate, 0.1 part of trioctyl phosphite and 0.2 part of the monoester compound of this invention or the conventional phenol compound as set forth in Table 9 at 150° C. for 5 minutes and the mixture was compression-molded at 150° C. into a film having a thickness of 0.5 mm. The results of the same light resistance test in Example 5 and the following thermal resistance test on the film obtained are shown in Table 9.

Thermal Resistance Test

The film was placed in a gear ageing tester according to JIS K7212-1977 at 150° C. for 500 hours in an air atmosphere and the retention of strength was measured in the same manner as in Example 5.

TABLE 9

| Sample No. | Monoester Compound or Conventional Phenol Compound | Light Resistance Retention of Strength (%) | Thermal Resistance Retention of Strength (%) |
|---|---|---|---|
| 1 | Compound No. 13 in Table 1 | 86 | 92 |
| 2 | Compound No. 14 in Table 1 | 94 | 85 |
| 3 | Compound No. 15 in Table 1 | 90 | 94 |
| 4 | Compound No. 16 in Table 1 | 82 | 79 |
| Comparative Sample No. | | | |
| 1 | None | 37 | 33 |
| 2 | 2,2'-Methylene bis(4-methyl-6-tert-butylphenol) | 58 | 61 |
| 3 | 2,2'-Methylene bis(4-ethyl-6-tert-butylphenol) | 60 | 57 |

EXAMPLE 9

By mixing rolls were mixed and kneaded 100 part of a polyvinyl chloride (tradename: "Geon 103 EP-8", product of Nihon Geon Co., Ltd.), 0.4 part of tris(2,2,6,6-tetramethyl-4-piperidine)trimellitate, 0.2 part of diisodecylphenyl phosphite, 0.2 part of zinc stearate and 0.3 part of the monoester compound of this invention or the conventional phenol compound as set forth in Table 10 at 175° C. for 5 minutes and the mixture was compression-molded at 175° C. into a film having a thickness of 0.5 mm. The results of the same light resistance test as in Example 5 and the following thermal resistance test on the film obtained are shown in Table 10.

Thermal Resistance Test

The film was place in the same gear ageing tester as in Example 8 at 150° C. for 30 hours in an air atmosphere and the degree of discoloration was judged by eye according to five classes of color change, i.e. Class 1 (extreme color change) to Class 5 (negligible or no color damage) and also the retention of strength was measured in the same manner as in Example 5.

TABLE 10

| Sample No. | Monoester Compound or Conventional Phenol Compound | Light Resistance Retention of Strength (%) | Thermal Resistance | |
|---|---|---|---|---|
| | | | Color Change (Class) | Retention of Strength (%) |
| 1 | Compound No. 9 in Table 1 | 93 | 5 | 89 |
| 2 | Compound No. 10 in Table 1 | 90 | 5 | 85 |
| 3 | Compound No. 11 in Table 1 | 85 | 5 | 90 |
| 4 | Compound No. 12 in Table 1 | 94 | 5 | 91 |
| Comparative Sample No. | | | | |
| 1 | None | 32 | 3 | 25 |
| 2 | 2,2'-(3,5,5-trimethylhexylidene)-bis(4,6-dimethylphenol) | 51 | 3 | 47 |

EXAMPLE 10

By mixing rolls were mixed and kneaded 100 parts of a polyethylene terephthalate having a limit viscosity of 0.89 measured in a 6:4 weight ratio mixed solution of phenol and tetrachloroethane at 120° C., 0.2 part of bis(2,2,6,6-tetramethyl-4-piperidine)sebacate, 0.2 part of tris(nonylphenyl) phosphite and 0.3 part of the monoester compound of this invention or the conventional phenol compound as set forth in Table 11 at 285° C. for 5 minutes and the mixture was compression-molded at 285° C. into a film having a thickness of 0.5 mm. The results of the same light resistance test as in Example 5 and the following thermal resistance test on the film obtained are shown in Table 11.

Thermal Resistance Test

The film was placed in the same gear ageing tester as in Example 8 at 150° C. for 240 hours in an air atmosphere and the retention of strength was measured in the same manner as in Example 5.

TABLE 11

| Sample No. | Monoester Compound or Conventional Phenol Compound | Light Resistance Retention of Strength (%) | Thermal Resistance Retention of Strength (%) |
| --- | --- | --- | --- |
| 1 | Compound No. 2 in Table 1 | 92 | 82 |
| 2 | Compound No. 3 in Table 1 | 90 | 91 |
| 3 | Compound No. 4 in Table 1 | 85 | 90 |
| 4 | Compound No. 5 in Table 1 | 83 | 87 |
| 5 | Compound No. 6 in Table 1 | 92 | 85 |
| 6 | Compound No. 7 in Table 1 | 94 | 93 |
| 7 | Compound No. 8 in Table 1 | 88 | 92 |
| Comparative Sample No. | | | |
| 1 | None | 34 | 32 |
| 2 | 2,2'-Methylene bis(4,6-dimethylphenol) | 57 | 61 |

EXAMPLE 11

A powdery polyoxymethylene diacetate having a limit viscosity of 2.10 measured in a 1:1 weight ratio mixed solution of tetrachloroethane and p-chlorophenol at 60° C. and having been obtained by polymerizing substantially anhydrous formaldehyde and then acetylating the polymer obtained with acetic anhydride was mixed with the monoester compound of this invention or the conventional phenol compound in amounts as set forth in Table 12 and 1.5 percent by weight of a reaction condensate of adipic acid dihydrazide and thiourea. In a test tube was charged 1 g of the mixture thus obtained and the test tube was placed in an oil bath at 222° C. for 70 minutes and the remaining amount of the mixture represented by R percent by weight was measured. The results are shown in Table 12. In general, in molding polyacetal resins into shaped articles, it is necessary that R (%) is at least 98%, and accordingly, the monoester compounds of this invention were found to be effective as the stabilizer for polyacetal resins.

TABLE 12

| Run No. | Monoester Compound or Conventional Phenol Compound | Amount added (weight %) | R (%) |
| --- | --- | --- | --- |
| 1 | Compound No. 5 in Table 1 | 0.2 | 99.2 |
| 2 | Compound No. 7 in Table 1 | 0.5 | 98.6 |
| 3 | Compound No. 8 in Table 1 | 0.3 | 99.7 |
| 4 | Compound No. 13 in Table 1 | 0.3 | 98.8 |
| 5 | Compound No. 14 in Table 1 | 0.4 | 99.0 |
| Comparative Run No. 1 | 2,2'-Methylene bis(4-methyl-6-tert-butylphenol) | 0.2 | 92.5 |
| Run No. 2 | 2,2'-Isobutylidene bis(4,6-dimethylphenol) | 0.5 | 93.0 |

What is claimed is:

1. A compound of the formula,

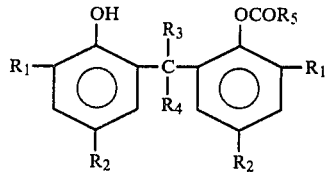

wherein $R_1$ and $R_2$, which may be the same or different, each represents a $C_{1-4}$ alkyl group, a $C_{5-6}$ cycloalkyl group or a methyl-substituted $C_{5-6}$ cycloalkyl group; and one of $R_3$ and $R_4$ represents a hydrogen atom and the other represents a hydrogen atom or a $C_{1-10}$ alkyl group or both of them represent a methyl group; $R_5$ represents a $C_{4-9}$ alkyl group, a $C_{3-7}$ cycloalkyl group, a phenyl group, a $C_{1-4}$ alkyl-substituted phenyl group, a $C_{1-4}$ alkoxy-substituted phenyl group, a mono- or di-$C_{1-4}$ alkyl-substituted hydroxyphenyl group, a benzyl group or a pyridyl group.

2. The compound of claim 1, wherein $R_1$ and $R_2$ each represents a $C_{1-4}$ alkyl group.

3. The compound of claim 2, wherein $R_1$ and $R_2$ are methyl groups.

4. The compound of claim 2, wherein one of $R_3$ and $R_4$ is a $C_{1-10}$ alkyl group.

5. The compound of claim 4, wherein one of $R_3$ and $R_4$ is a branched $C_{3-8}$ alkyl group.

6. The compound of claim 5, wherein one of $R_3$ and $R_4$ is an isopropyl group.

7. The compound of claim 5, wherein one of $R_3$ and $R_4$ is a 2,4,4-trimethylpentyl group.

8. The compound of claim 4, wherein $R_5$ is a phenyl group.

9. The compound of claim 4, wherein $R_5$ is a 3,5-di-tert-butyl-4-hydroxyphenyl group.

10. The Compound of claim 4, wherein $R_5$ is a tert-butyl group.

11. The compound of claim 4, wherein $R_5$ is a pyridyl group.

12. The compound of claim 4, wherein $R_5$ is a 4-methylphenyl group.

13. The compound of claim 4, wherein $R_5$ is a 4-methoxyphenyl group.

14. The compound of claim 2, wherein $R_3$ and $R_4$ are hydrogen atoms.

15. The compound of claim 14, wherein $R_5$ is a phenyl group.

16. The compound of claim 2, wherein $R_1$ is a tert-butyl group.

17. The compound of claim 16, wherein $R_2$ is a methyl group.

18. The compound of claim 16, wherein $R_2$ is an ethyl group.

19. The compound of claim 17, wherein $R_5$ is a phenyl group.

20. The compound of claim 17, wherein $R_5$ is a benzyl group.

21. The compound of claim 18, wherein $R_5$ is a phenyl group.

22. The compound of claim 18, wherein $R_5$ is a cyclohexyl group.

23. The compound of claim 2, wherein $R_2$ is a methyl group.

24. The compound of claim 23, wherein $R_1$ is a cyclohexyl group.

25. The compound of claim 23, wherein $R_1$ is a 1-methylcyclohexyl group.

26. The compound of claim 24, wherein $R_5$ is a phenyl group.

27. The compound of claim 25, wherein $R_5$ is a phenyl group.

28. The compound of claim 25, wherein $R_5$ is a 4-butoxyphenyl group.

29. A method of preparing a compound which comprises reacting a 2,2'-alkylidene bis(4,6-di-substituted phenol) of the formula (II),

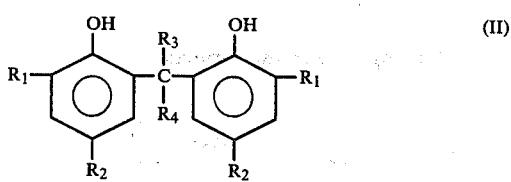
(II)

wherein $R_1$ and $R_2$, which may be the same or different, each represents a $C_{1-4}$ alkyl group, a $C_{5-6}$ cycloalkyl group, or a methyl-substituted $C_{5-6}$ cycloalkyl group; and one of $R_3$ and $R_4$ represents a hydrogen atom and the other represents a hydrogen atom or a $C_{1-10}$ alkyl group or both of them represent a methyl group, with an esterifying agent selected from the group consisting of the compounds of the formulae (III) and (IV), $R_5COCl$ (III)

and $(R_5CO)_2O$ (IV)

wherein $R_5$ represents a $C_{4-9}$ alkyl group, a $C_{3-7}$ cycloalkyl group, a phenol group, a $C_{1-4}$ alkyl-substituted phenyl group, a $C_{1-4}$ alkoxy-substituted phenyl group, a mono- or di-$C_{1-4}$ alkyl-substituted hydroxyphenyl group, a benzyl group or a pyridyl group, substantially at an equimolar amount in the presence of a reaction medium while maintaining the reaction temperature at from about 0° C. to about 30° C. until about 50% of the 2,2'-alkylidene bis(4,6-di-substituted phenol) is converted to the compound of the formula

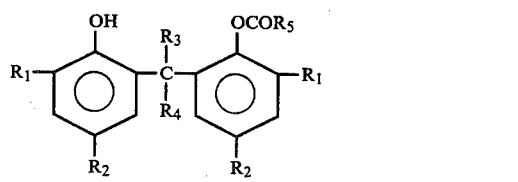

wherein $R_1$ and $R_2$, which may be the same or different, each represents a $C_{1-4}$ alkyl group, a $C_{5-6}$ cycloalkyl group or a methyl-substituted $C_{5-6}$ cycloalkyl group; and one of $R_3$ and $R_4$ represents a hydrogen atom and the other represents a hydrogen atom or a $C_{1-10}$ alkyl group or both of them represent a methyl group; $R_5$ represents a $C_{4-9}$ alkyl group, a $C_{3-7}$ cycloalkyl group, a phenyl group, a $C_{1-4}$ alkyl-substituted phenyl group, a $C_{1-4}$ alkoxy-substituted phenyl group, a mono- or di-$C_{1-4}$ alkyl-substituted hydroxyphenyl group, a benzyl group or a pyridyl group and thereafter raising said reaction temperature to range from about 50° C. to about 100° C.

30. The method of claim 29, wherein the mole ratio of the esterifying agent to the 2,2'-alkylidene bis(4,6-di-substituted phenol) ranges from about 1.0 to about 1.3.

31. The method of claim 30, wherein the mole ratio of the esterifying agent to the 2,2'-alkylidene bis(4,6-di-substituted phenol) ranges from 1.00 to 1.10.

32. The method of claim 29, wherein the reaction is carried out in the presence of a basic catalyst.

33. The method of claim 29, wherein the reaction temperature is maintained at about 20° C. until about 50% of the 2,2'-alkylidene bis(4,6-di-substituted phenol) is converted to the compound of the formula (I) of claim 1.

34. The method of claim 29, wherein the reaction temperature is raised to about 80° C. after 50% of the 2,2'-alkylidene bis(4,6-di-substituted phenol) is converted to the compound of claim 1.

35. A polyurethane synthetic resin composition comprising 100 parts by weight of polyurethane synthetic resin and about 0.001 to about 10 parts by weight of the compound of the Formula (I) of claim 1.

36. A compound of the formula

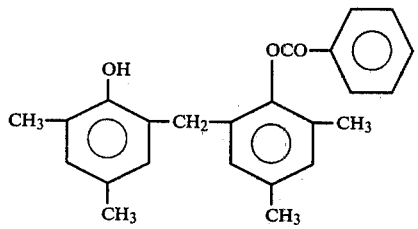

37. A compound of the formula

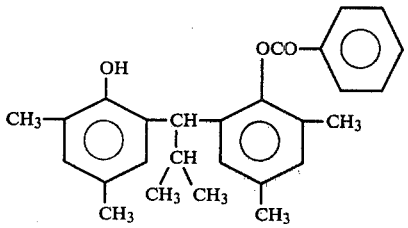

38. A compound of the formula

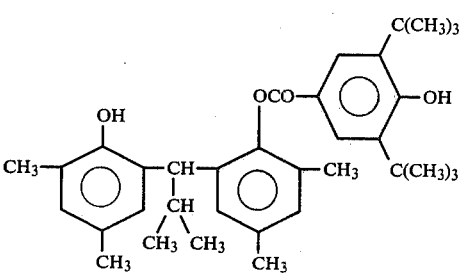

39. A compound of the formula

40. A compound of the formula
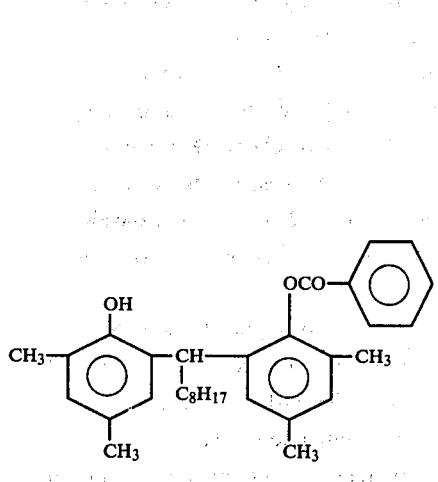
41. A compound of the formula
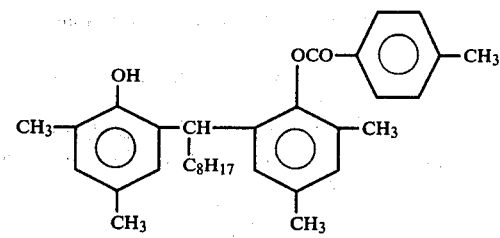
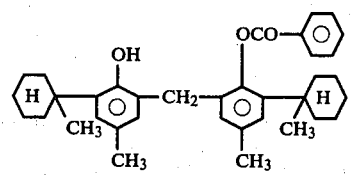
42. The compound of claim 1 wherein $R_5$ represents a phenyl group, a $C_{1-4}$ alkyl-substituted phenyl group, a $C_{1-4}$ alkoxy-substituted phenyl group, or a mono- or di- $C_{1-4}$ alkyl-substituted hydroxyphenyl group.
* * * * *